(12) United States Patent
Huo et al.

(10) Patent No.: US 11,785,208 B2
(45) Date of Patent: *Oct. 10, 2023

(54) PREDICTION METHOD FOR DECODING AND APPARATUS, AND COMPUTER STORAGE MEDIUM

(71) Applicant: GUANGDONG OPPO MOBILE TELECOMMUNICATIONS CORP., LTD., Guangdong (CN)

(72) Inventors: Junyan Huo, Guangdong (CN); Yanzhuo Ma, Guangdong (CN); Shuai Wan, Guangdong (CN); Fuzheng Yang, Guangdong (CN); Xinwei Li, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/677,810

(22) Filed: Feb. 22, 2022

(65) Prior Publication Data
US 2022/0182610 A1    Jun. 9, 2022

Related U.S. Application Data

(63) Continuation of application No. 17/234,639, filed on Apr. 19, 2021, now Pat. No. 11,297,313, which is a
(Continued)

(51) Int. Cl.
*H04N 19/105*   (2014.01)
*H04N 19/132*   (2014.01)
*H04N 19/176*   (2014.01)

(52) U.S. Cl.
CPC ......... *H04N 19/105* (2014.11); *H04N 19/132* (2014.11); *H04N 19/176* (2014.11)

(58) Field of Classification Search
CPC .... H04N 19/176; H04N 19/105; H04N 19/52; H04N 19/132; H04N 19/136; H04N 19/117; H04N 19/82
See application file for complete search history.

(56) References Cited

U.S. PATENT DOCUMENTS

| 8,644,395 | B2 * | 2/2014 | Huang | H04N 19/56 375/240.27 |
|---|---|---|---|---|
| 10,129,542 | B2 | 11/2018 | Gu | |

(Continued)

FOREIGN PATENT DOCUMENTS

| CN | 102611885 A | 7/2012 |
|---|---|---|
| CN | 102845063 A | 12/2012 |

(Continued)

OTHER PUBLICATIONS

Written Opinion of the International Search Authority in the international application No. PCT/CN2018/123657, dated Aug. 27, 2019.
(Continued)

*Primary Examiner* — Daniel Chang
(74) *Attorney, Agent, or Firm* — Perkins Coie LLP

(57) ABSTRACT

A prediction method, apparatus, and a computer storage medium for decoding, the method includes: acquiring reference samples adjacent to at least one side of a decoding block; determining a reference point from the at least one side and determining reference sample positions to be selected corresponding to the at least one side according to a preset number of samples; selecting reference samples corresponding to the reference sample positions to be selected from the reference samples based on the reference sample positions to be selected; and performing prediction decoding on the decoding block based on the selected reference samples.

18 Claims, 12 Drawing Sheets

Related U.S. Application Data continuation of application No. PCT/CN2018/123657, filed on Dec. 25, 2018.

(56) References Cited

U.S. PATENT DOCUMENTS

| | | | |
|---|---|---|---|
| 10,462,483 B1* | 10/2019 | Xu | H04N 19/44 |
| 10,491,893 B1* | 11/2019 | Zhao | H04N 19/176 |
| 2006/0146939 A1* | 7/2006 | Wang | H04N 19/593 |
| | | | 375/E7.176 |
| 2011/0280304 A1* | 11/2011 | Jeon | H04N 19/176 |
| | | | 375/E7.243 |
| 2011/0293001 A1* | 12/2011 | Lim | H04N 19/44 |
| | | | 375/E7.243 |
| 2013/0034167 A1* | 2/2013 | Zheng | H04N 19/583 |
| | | | 375/E7.123 |
| 2013/0094776 A1 | 4/2013 | Lainema et al. | |
| 2013/0188883 A1 | 7/2013 | Gisquet et al. | |
| 2013/0223532 A1* | 8/2013 | Xi | H04N 19/117 |
| | | | 375/240.16 |
| 2014/0139627 A1* | 5/2014 | Chen | H04N 19/61 |
| | | | 348/43 |
| 2016/0044329 A1 | 2/2016 | Wang et al. | |
| 2016/0057441 A1* | 2/2016 | Skupin | H04N 19/52 |
| | | | 375/240.25 |
| 2016/0065988 A1 | 3/2016 | Kawamura et al. | |
| 2016/0330480 A1* | 11/2016 | Liu | H04N 13/161 |
| 2016/0353114 A1 | 12/2016 | Sasai et al. | |
| 2016/0366415 A1* | 12/2016 | Liu | H04N 19/70 |
| 2016/0373742 A1* | 12/2016 | Zhao | H04N 19/136 |
| 2017/0150176 A1* | 5/2017 | Zhang | H04N 19/91 |
| 2017/0150186 A1* | 5/2017 | Zhang | H04N 19/625 |
| 2017/0155920 A1* | 6/2017 | Park | H04N 19/52 |
| 2017/0272757 A1 | 9/2017 | Xu et al. | |
| 2017/0272760 A1 | 9/2017 | Lai | |
| 2017/0318305 A1 | 11/2017 | Kobayashi | |
| 2017/0353719 A1* | 12/2017 | Liu | H04N 19/156 |
| 2018/0048889 A1* | 2/2018 | Zhang | H04N 19/159 |
| 2018/0063553 A1* | 3/2018 | Zhang | H04N 19/46 |
| 2018/0098086 A1* | 4/2018 | Chuang | H04N 19/61 |
| 2018/0139443 A1* | 5/2018 | Park | H04N 19/11 |
| 2018/0176592 A1* | 6/2018 | Lim | H04N 19/117 |
| 2018/0176594 A1* | 6/2018 | Zhang | H04N 19/593 |
| 2018/0220138 A1* | 8/2018 | He | H04N 19/136 |
| 2019/0132596 A1* | 5/2019 | Sharman | H04N 19/60 |
| 2019/0166370 A1* | 5/2019 | Xiu | H04N 19/176 |
| 2019/0246113 A1* | 8/2019 | Xu | H04N 19/52 |
| 2019/0342568 A1* | 11/2019 | Zhao | H04N 19/132 |
| 2020/0021817 A1* | 1/2020 | Van der Auwera | H04N 19/52 |
| 2020/0036985 A1* | 1/2020 | Jang | H04N 19/186 |
| 2020/0045311 A1* | 2/2020 | Yoo | H04N 19/159 |
| 2020/0045336 A1* | 2/2020 | Xiu | H04N 19/597 |
| 2020/0099928 A1* | 3/2020 | Piao | H04N 19/88 |
| 2020/0128272 A1* | 4/2020 | Jangwon | H04N 19/157 |
| 2020/0145649 A1* | 5/2020 | Kim | H04N 19/46 |
| 2020/0154100 A1* | 5/2020 | Zhao | H04N 19/46 |
| 2020/0154115 A1* | 5/2020 | Ramasubramonian | |
| | | | H04N 19/176 |
| 2020/0154124 A1* | 5/2020 | Lee | H04N 19/105 |
| 2020/0177878 A1* | 6/2020 | Choi | H04N 19/11 |
| 2020/0288135 A1* | 9/2020 | Laroche | H04N 19/105 |
| 2020/0296391 A1* | 9/2020 | Choi | H04N 19/105 |
| 2021/0297656 A1* | 9/2021 | Ma | H04N 19/70 |

FOREIGN PATENT DOCUMENTS

| | | | |
|---|---|---|---|
| CN | 102611885 B | 4/2014 | |
| CN | 104125463 A | 10/2014 | |
| CN | 105474639 A | 4/2016 | |
| CN | 106688238 A | 5/2017 | |
| CN | 103814574 B | 1/2018 | |
| EP | 3806472 A1 | 4/2021 | |
| EP | 3833021 A1 | 6/2021 | |
| EP | 3840376 A1 | 6/2021 | |
| EP | 3840387 A1 | 6/2021 | |
| EP | 3843389 A1 | 6/2021 | |
| JP | 2021511698 A | 5/2021 | |
| RU | 2595592 C2 | 8/2016 | |
| WO | 2013160277 A1 | 10/2013 | |
| WO | WO-2019072595 A1 * | 4/2019 | ........... H04N 19/105 |
| WO | 2019147910 A1 | 8/2019 | |

OTHER PUBLICATIONS

Non-Final Office Action of the U.S. Appl. No. 17/234,639, dated Jul. 22, 2021.
Notice of Allowance of the U.S. Appl. No. 17/234,639, dated Nov. 19, 2021.
Office Action of the Indian application No. 202117012985, dated Feb. 3, 2022.
First Office Action of the Chilean application No. 202100831, dated Feb. 14, 2022.
First Office Action of the European application No. 18945329.3, dated Feb. 15, 2022.
Chen J et al:"Algorithm description for Versatile Video Coding and Test Model 3 (VTM 3)",12. JVET Meeting; Oct. 3, 2018-Oct. 12, 2018; Macao; (The Joint Video Exploration Team of ISO/IEC JTC1/SC29/WG11 and ITU-T SG.16 ),No. JVET-L 1002 Dec. 24, 2018 (Dec. 24, 2018), XP030251962.
Ma (Huawei) X et al: "CE3-related: CCLM coefficients derivation method without down-sampling operation", 12. JVET Meeting; Oct. 3, 2018-Oct. 12, 2018; Macao; (The Joint Video Exploration Team of ISO/IEC JTC1 SC29/WG11 and ITU-TSG.16 ),No. JVET-L0341 Sep. 29, 2018 (Sep. 29, 2018), XP030194048.
Zhang (Bytedance) K et al: "CE3-related: CCLM prediction with single-line neighbouring luma samples", 12. JVET Meeting; Oct. 3, 2018-Oct. 12, 2018; Macao; (The Joint Video Exploration Team of ISO/IEC JTC1/SC29 WG11 and ITU-T SG.16 ),No. JVET-L0329 Oct. 4, 2018 (Oct. 4, 2018), XP030194701.
Choi (LGE) J et al: "CE3-related : Reduced number of reference samples for CCLM parameter calculation", 12. JVET Meeting; Oct. 3, 2018-Oct. 12, 2018; Macao; (The Joint Video Exploration Team of ISO/IEC JTC1/SC29 WG11 and ITU-T SG.16 ), No. JVET-L0138 Oct. 6, 2018 (Oct. 6, 2018), XP030195032.
Supplementary European Search Report in the European application No. 18945329.3, dated Jul. 14, 2021. 9 pages.
International Search Report in the international application No. PCT/CN2018/123657, dated Aug. 27, 2019.
Second Office Action of the European application No. 18945329.3, dated Jul. 20, 2022. 4 pages.
First Office Action of the Chinese application No. 202110246654.2, dated Jul. 26, 2022. 19 pages with English translation.
First Office Action of the Chinese application No. 202110270601 4, dated Jul. 21, 2022. 19 pages with English translation.
First Office Action of the U.S. Appl. No. 17/677,813, dated Oct. 6, 2022. 31 pages.
Second Office Action of the Chilean application No. 202100831, dated May 2, 2022. 19 pages with English translation.
First Office Action of the Canadian application No. 3113787, dated Apr. 28, 2022. 5 pages.
First Office Action of the Russian application No. 2021110172, dated Apr. 27, 2022. 11 pages with English translation.
Second Office Action of the Chinese application No. 202110270601. 4, dated Nov. 11, 2022. 18 pages with English translation.
First Office Action of the U.S. Appl. No. 17/677,807, dated Nov. 25, 2022. 32 pages.
First Office Action of the U.S. Appl. No. 17/677,802, dated Nov. 25, 2022. 38 pages.
Second Office Action of the Chinese application No. 202110246654. 2, dated Dec. 2, 2022. 17 pages with English translation.
Second Office Action of the Canadian application No. 3113787, dated Dec. 23, 2022. 3 pages.
Notice of Reasons for Refusal for Japanese application No. 2021-518718, dated Jan. 6, 2023. 13 pages with English translation.
Notice of Oral Examination of the European application No. 18945329. 3, dated Jan. 27, 2023. 8 pages.
Hong, Lei. Singapore Application No. 11202102435V Written Opinion dated Mar. 9, 2023, pp. 1-11.

(56) References Cited

OTHER PUBLICATIONS

First Office Action of the Israeli application No. 281399, dated Jun. 27, 2023. 4 Pages.
Corrected Notice of Allowance of the U.S. Appl. No. 17/677,813, dated Apr. 27, 2023. 15 Pages.
Corrected Notice of Allowance of the U.S. Appl. No. 17/677,807, dated Apr. 27, 2023. 15 Pages.
Corrected Notice of Allowance of the U.S. Appl. No. 17/677,802, dated Apr. 27, 2023. 20 Pages.
First Office Action of the Indonesian application No. P00202102731, dated Jul. 13, 2023. 3 pages with English translation.
Second Office Action of the Japanese application No. 2021-518718, dated Jul. 21, 2023. 6 pages with English translation.

* cited by examiner

PREDICTION METHOD FOR DECODING AND APPARATUS, AND COMPUTER STORAGE MEDIUM

CROSS-REFERENCE TO RELATED APPLICATION

This is a continuation application of U.S. application Ser. No. 17/234,639, filed Apr. 19, 2021, which is a continuation application of International Application No. PCT/CN2018/123657 filed on Dec. 25, 2018, the contents of which are hereby incorporated by reference in their entirety.

TECHNICAL FIELD

Embodiments of the disclosure relate to the technical field of video coding and decoding, and particularly to a prediction method for decoding and device and a computer storage medium.

BACKGROUND

With the increase of requirements on video display quality, novel video application forms such as high-definition and ultra-high-definition videos have emerged. H.265/High Efficiency Video Coding (HEVC) is the latest international video compression standard at present. Compared with that of a previous-generation video coding standard H.264/Advanced Video Coding (AVC), the compression performance of H.265/HEVC is improved by about 50% but still cannot meet a rapid development requirement of video applications, particularly novel video applications such as ultra-high-definition and Virtual Reality (VR) videos.

The video coding experts group of the International Telecommunication Union Telecommunication Standardization Sector (ITU-T) and the motion picture experts group of the International Standardization Organization (ISO)/International Electrotechnical Communication (IEC) set up the Joint Video Exploration Team (JVET) in 2015 to develop a next-generation video coding standard. A Joint Exploration Test Model (JEM) is a universal reference software platform, and verification of different coding tools is implemented based on this platform. The next-generation video coding standard was named formally by the JVET as Versatile Video Coding (VVC) in April, 2018, and a corresponding test model is a View Transformation Model (VTM). A prediction method for encoding and decoding based on a linear model has been integrated in the reference software JEM and VTM, and through the linear model, a chroma component of a current decoding block is predicted according to a luma component thereof. However, when the linear model is constructed, a subset of neighbouring reference samples formed by the neighbouring reference samples is not so reasonable, which makes the search complexity relatively high and reduces the video picture decoding prediction performance.

SUMMARY

In view of this, the embodiments of the disclosure provide a prediction method for decoding and device and a computer storage medium. Both importance and dispersion are considered for neighbouring reference samples in a subset of the neighbouring reference samples, and the subset of the neighbouring reference samples includes few samples, so that the search complexity is reduced, the video picture decoding prediction performance is improved, and the bit rate is further reduced.

The technical solutions of the embodiments of the disclosure may be implemented as follows.

According to a first aspect, the embodiments of the disclosure provide a prediction method for decoding, which may include the following operations.

Reference samples adjacent to at least one side of a decoding block are acquired to obtain a first set of neighbouring reference samples.

A reference point is determined from the at least one side, and reference sample positions to be selected corresponding to the at least one side are determined according to a preset number of samples.

Reference samples corresponding to the reference sample positions to be selected are selected from the first set of the neighbouring reference samples based on the reference sample positions to be selected, and the selected reference samples form a subset of the neighbouring reference samples.

Prediction decoding is performed on the decoding block based on the subset of the neighbouring reference samples.

According to a second aspect, the embodiments of the disclosure provide a prediction device for decoding, which may include an acquisition unit, a determination unit, a selection unit and a decoding unit.

The acquisition unit may be configured to acquire reference samples adjacent to at least one side of a decoding block to obtain a first set of neighbouring reference samples.

The determination unit may be configured to determine a reference point from the at least one side and determine reference sample positions to be selected corresponding to the at least one side according to a preset number of samples.

The selection unit may be configured to select reference samples corresponding to the reference sample positions to be selected from the first set of the neighbouring reference samples based on the reference sample positions to be selected and form a subset of the neighbouring reference samples using the selected reference samples.

The decoding unit may be configured to perform prediction decoding on the decoding block based on the subset of the neighbouring reference samples.

According to a third aspect, the embodiments of the disclosure provide a prediction device for decoding, which may include a memory and a processor.

The memory may be configured to store a computer program capable of running in the processor.

The processor may be configured to run the computer program to execute operations of the method as described in the first aspect.

According to a fourth aspect, the embodiments of the disclosure provide a computer storage medium, which may store a decoding prediction program. The decoding prediction program may be executed by at least one processor to implement operations of the method as described in the first aspect.

The embodiments of the disclosure provide a prediction method for decoding and device and a computer storage medium. Reference samples adjacent to the at least one side of the decoding block are acquired at first to obtain the first set of neighbouring reference samples. Then, a reference point is determined from the at least one side, and reference sample positions to be selected corresponding to the at least one side are determined according to the preset number of samples. Next, reference samples corresponding to the reference sample positions to be selected are selected from the first set of neighbouring reference samples based on the reference sample positions to be selected, and the selected reference samples form the subset of the neighbouring reference samples. Finally, prediction decoding is performed on the decoding block based on the subset of the neighbouring reference samples. Both importance and dispersion are considered for selection of neighbouring reference samples in the subset of the neighbouring reference samples, so that model parameters constructed based on the subset of the neighbouring reference samples are relatively accurate, and the video picture decoding prediction performance may be improved. Moreover, the subset of the neighbouring reference samples includes few samples, so that the search complexity is also reduced, the video picture decoding prediction performance is improved and the bit rate is further reduced.

DETAILED DESCRIPTION

In order to facilitate understanding of the characteristics and technical contents of the embodiments of the disclosure, implementation of the embodiments of the disclosure will be described below in combination with the drawings in detail. The appended drawings are only adopted for description as references and not intended to limit the embodiments of the disclosure.

In a video picture, a first colour component, a second colour component and a third colour component are usually adopted to represent decoding blocks. The three colour components are a luma component, a blue chroma component and a red chroma component respectively. Specifically, the luma component is usually represented by a sign Y, the blue chroma component is usually represented by a sign Cb, and the red chroma component is usually represented by a sign Cr.

Figure 1A:
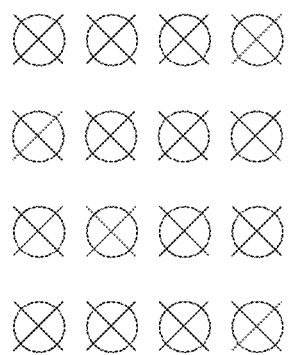
FIG. 1A to FIG. 1C are schematic structure diagrams of video picture sample formats in a related technical solution respectively.
Figure 1B:
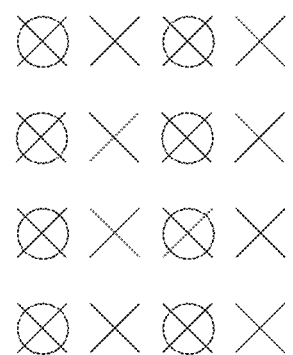
Figure 1C:
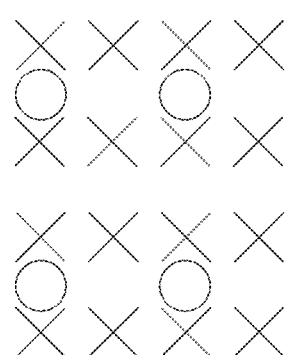

In the embodiments of the disclosure, the first colour component may be the luma component Y, the second colour component may be the blue chroma component Cb, and the third colour component may be the red chroma component Cr. However, no specific limits are made thereto in the embodiments of the disclosure. At present, the common sample format is YCbCr format. The YCbCr format includes the formats as illustrated in FIG. 1A to FIG. 1C respectively. In the figures, the cross (X) represents a sample point of the first colour component, and the circle (O) represents a sample point of the second colour component or the third colour component. The YCbCr format includes the following formats.

A 4:4:4 format: as illustrated in FIG. 1A, the second colour component or the third colour component is not down-sampled. Four samples of the first colour component, four samples of the second colour component and four samples of the third colour component are extracted from every four continuous samples in each scan line.

A 4:2:2 format: as illustrated in FIG. 1B, 2:1 horizontal sampling is performed on the first colour component relative to the second colour component or the third colour component, and vertical down-sampling is not performed. Four samples of the first colour component, two samples of the second colour component and two samples of the third colour component are extracted from every four continuous samples in each scan line.

A 4:2:0 format: as illustrated in FIG. 1C, 2:1 horizontal down-sampling and 2:1 vertical down-sampling are performed on the first colour component relative to the second colour component or the third colour component. Two samples of the first colour component, one sample of the second colour component and one sample of the third colour component are extracted from every two continuous samples in a horizontal scan line and a vertical scan line.

Under the condition that the 4:2:0 YCbCr format is adopted for a video picture, if a first colour component of the video picture is a decoding block with a size of 2N×2N, a corresponding second colour component or third colour component is a decoding block with a size of N×N, where N is a side length of the decoding block. In the embodiments of the disclosure, the following descriptions are made with the 4:2:0 format as an example. However, the technical solutions of the embodiments of the disclosure are also applied to other sample formats.

In the next-generation video coding standard H.266, for further improving the encoding and decoding performance, Cross-Component Prediction (CCP) is extended and improved, and Cross-Component Linear Model Prediction (CCLM) is proposed. In H.266, CCLM implements prediction from the first colour component to the second colour component, from the first colour component to the third colour component and between the second colour component and the third colour component. The following descriptions are made with prediction from the first colour component to the second colour component as an example, but the technical solutions of the embodiments of the disclosure may also be applied to prediction of other colour components.

It can be understood that, for reducing a redundancy between the first colour component and the second colour component, a CCLM prediction mode is adopted for a VTM. In such case, the first colour component and the second colour component are the same decoding block, and the second colour component is predicted based on a first colour component reconstructed value of the same decoding block. For example, a prediction model in a formula (1) is adopted:

$$\text{Pred}_C[i,j] = \alpha \cdot \text{Rec}_L[i,j] + \beta \quad (1).$$

i, j represents a position coordinate of a sample in the decoding block, i representing a horizontal direction and j representing a vertical direction, $\text{Pred}_C[i, j]$ represents a second colour component predicted value corresponding to the sample with the position coordinate [i, j] in the decoding block, $\text{Rec}_L[i,j]$ represents a first colour component reconstructed value corresponding to the sample with the position coordinate [i, j] in the same decoding block (after down-sampling), and $\alpha$ and $\beta$ are model parameters of the prediction model.

There are many manners for constructing the model parameters $\alpha$ and $\beta$. A least-square evaluation-based regression construction manner may be adopted, or a maximum and minimum-based construction manner may be adopted, or even another construction manner may be adopted. No specific limits are made thereto in the embodiments of the disclosure. The following descriptions are made with the least square evaluation-based regression construction manner and the maximum and minimum-based construction manner as examples respectively.

In VVC, a method for deriving model parameters of the least-square-based regression construction is initially accepted. Specifically, $\alpha$ and $\beta$ in the following formula (2) may be deduced by minimizing regression errors of first colour component neighbouring reference values and second colour component neighbouring reference values around a decoding block:

$$\begin{cases} \alpha = \dfrac{2N \cdot \sum (L(n) \cdot C(n)) - \sum L(n) \cdot \sum C(n)}{2N \sum (L(n) \cdot L(n)) - \sum L(n) \cdot \sum L(n)} \\ \beta = \dfrac{\sum C(n) - \alpha \cdot \sum L(n)}{2N} \end{cases} \quad (2)$$

Figure 2A:
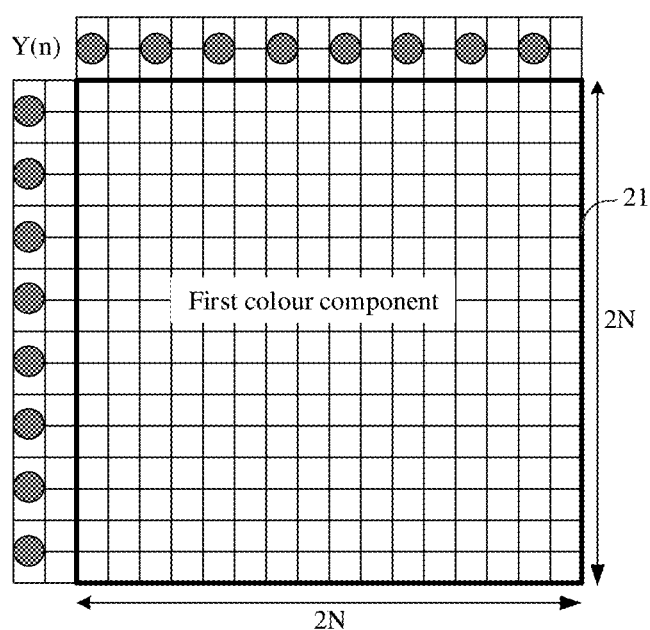
FIG. 2A and FIG. 2B are schematic sampling diagrams of first colour component neighbouring reference values and second colour component neighbouring reference values of a decoding block in the related technical solution respectively.
Figure 2B:
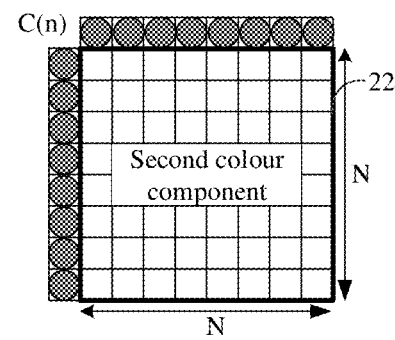

L(n) represents the first colour component neighbouring reference value corresponding to a left side and upper side after down-sampling, C(n) represents the second colour component neighbouring reference value corresponding to the left side and the upper side, N is the side length of the second colour component decoding block, and n=1, 2, . . . , 2N. FIG. 2A and FIG. 2B illustrate sampling diagrams of neighbouring reference values of the first colour component and neighbouring reference values of the second colour component of a decoding block in the related technical solution respectively. In FIG. 2A, the large bold block is adopted to highlight a first colour component decoding block 21, and the gray solid circle is adopted to indicate a neighbouring reference value L(n) of the first colour component decoding block 21. In FIG. 2B, the large bold block is adopted to highlight a second colour component decoding block 22, and the gray solid circle is adopted to indicate a neighbouring reference value C(n) of the second colour component decoding block 22. FIG. 2A illustrates the first colour component decoding block 21 with a size of 2N×2N. For a video picture in a 4:2:0 format, a size of a second colour component corresponding to a first colour component with the size of 2N×2N is N×N, as illustrated by 22 in FIG. 2B. That is, FIG. 2A and FIG. 2B are schematic diagrams of decoding blocks obtained by performing first colour component sampling and second colour component sampling on the same decoding block.

In VVC, a simplified method for deriving model parameters is accepted recently. Specifically, a maximum first colour component neighbouring reference value and a minimum first colour component neighbouring reference value may be searched to deduce the model parameters $\alpha$ and $\beta$ in the following formula (3) according to the principle that "two points determine a line":

$$\begin{cases} \alpha = \dfrac{L_{max} - L_{min}}{C_{max} - C_{min}} \\ \beta = L_{min} - \alpha \cdot C_{min} \end{cases} \quad (3)$$

Figure 3:
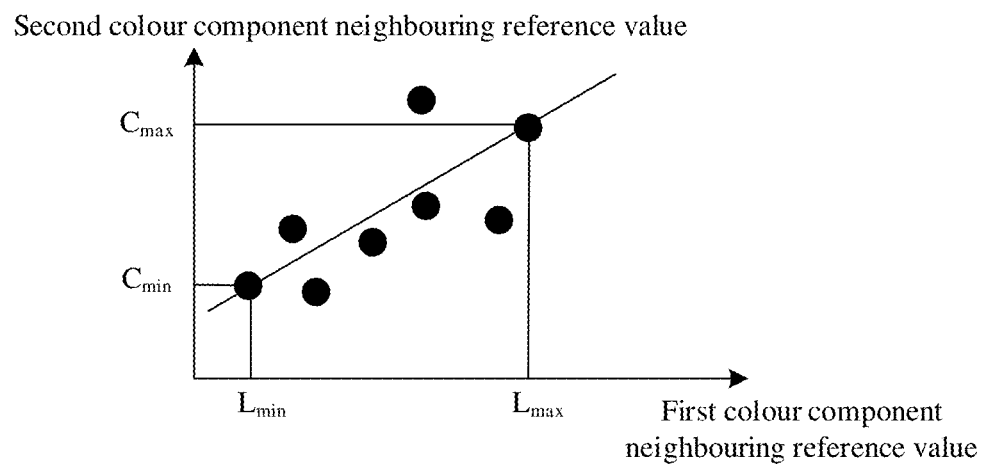
FIG. 3 is a schematic structure diagram of constructing a prediction model based on maximums and minimums of a decoding block in the related technical solution.

$L_{max}$ and $L_{min}$ represent the maximum and minimum obtained by searching the first colour component neighbouring reference values corresponding to the left side and the upper side after down-sampling, and $C_{max}$ and $C_{min}$ represent second colour component neighbouring reference values corresponding to reference samples at positions corresponding to $L_{max}$ and $L_{min}$. FIG. 3 illustrates a structure diagram of constructing a prediction model based on maximums and minimums of a decoding block in the related technical solution. The abscissa represents neighbouring reference values of the first colour component of the decoding block, and the ordinate represents neighbouring reference values of the second colour component of the decoding block. The model parameters $\alpha$ and $\beta$ may be calculated through the formula (3) according to $L_{max}$, $L_{min}$, $C_{max}$ and $C_{min}$, and a constructed prediction model is $C = \alpha \cdot L + \beta$. Here, L represents a first colour component reconstructed value corresponding to a sample in the decoding block, and C represents a second colour component predicted value corresponding to the sample in the decoding block.

For construction of a set of neighbouring reference samples in CCLM, there are many conditions in the conventional art, which will be described below respectively.

(a) Distinguishing from the Shape of the Decoding Block

Figure 4A:
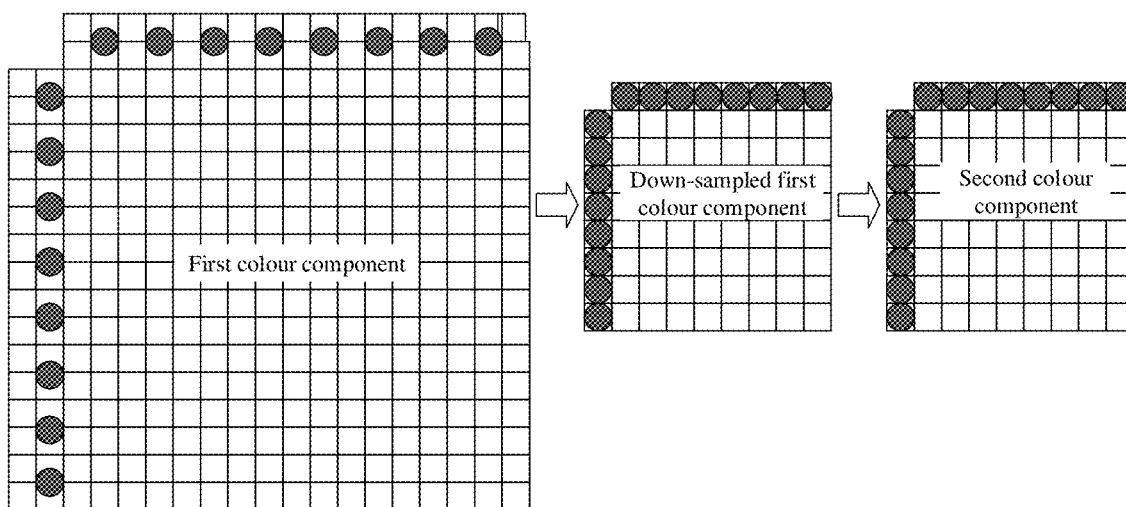
FIG. 4A and FIG. 4B are schematic structure diagrams of selecting neighbouring reference samples for a square decoding block and a non-square decoding block according to the related technical solution respectively.

FIG. 4A illustrates a structure diagram of selecting neighbouring reference samples for a square decoding block according to the related technical solution. As illustrated in FIG. 4A, the decoding block is a square decoding block, and all neighbouring samples corresponding to a left side and upper side of the decoding block may be determined as reference samples. For a first colour component, down-sampling is required to be performed at first such that the down-sampled first colour component has the same resolution as a second colour component. In FIG. 4A, the gray solid circle is adopted to represent the neighbouring reference sample selected for the square decoding block.

Figure 4B:
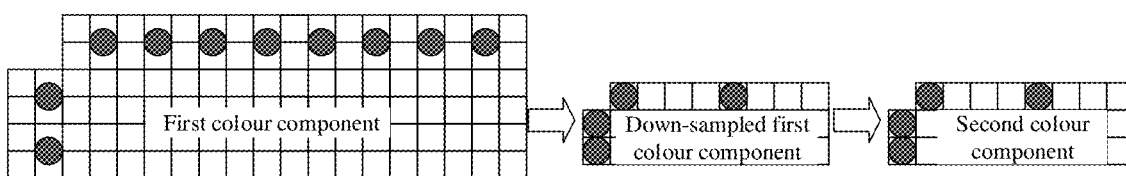

FIG. 4B illustrates a structure diagram of selecting neighbouring reference samples for a non-square decoding block according to the related technical solution. As illustrated in FIG. 4B, the decoding block is a non-square decoding block, and a width and height of the decoding block are unequal. On one hand, down-sampling on a first colour component is required to be performed at first such that the down-sampled first colour component has the same resolution as a second colour component. On the other hand, neighbouring samples corresponding to a long side of the decoding block are required to be further down-sampled such that the number of neighbouring reference samples obtained for the long side is equal to the number of neighbouring reference samples corresponding to a short side. In FIG. 4B, the gray solid circle represents the neighbouring reference sample selected for the non-square decoding block.

(b) Distinguishing from Existence of Neighbouring Samples Corresponding to the Left Side or Upper Side of the Decoding Block.

When neighbouring samples corresponding to the left side and upper side of the decoding block are available, all the samples in a row adjacent to the upper side and the neighbouring samples in a column adjacent to the left side may be determined as neighbouring reference samples.

When neighbouring samples corresponding to only one of the left side and upper side of the decoding block are available, the neighbouring samples corresponding to the available side are determined as neighbouring reference samples.

When all the neighbouring samples corresponding to the left side and upper side of the decoding block are unavailable, there is no neighbouring reference sample, the model parameter $\alpha$ is set to be 0, and the model parameter $\beta$ is set to be an intermediate value 512 of the second colour component, namely second colour component predicted values corresponding to all samples in the decoding block are 512.

It is to be noted that, if N is defined as a length of the short side of the second colour component decoding block, when all the neighbouring samples corresponding to the left side and upper side of the decoding block are available, there are totally 2N neighbouring reference samples available for CCLM. In addition, unless otherwise specified, the following descriptions are made with the condition that all the neighbouring samples corresponding to the left side and upper side of the decoding block are available as an example.

(c) Scheme of a Subset of the Neighbouring Reference Samples (Samples are Reduced)

In a process of calculating the model parameter for CCLM, the required operation complexity is directly proportional to the number of neighbouring reference samples for CCLM. Therefore, for reducing the operation complexity, the L0138 proposal in the twelfth meeting of the JVET proposes a technical scheme of reducing the number of neighbouring reference samples for CCLM based on a size of a second colour component block corresponding to a decoding block. Table 1 illustrates a relationship table between a size of a second colour component block corresponding to a decoding block and the number of neighbouring reference samples according to the related technical solution. In Table 1, $N_1$ is the number of neighbouring reference samples for CCLM in a conventional technical solution, and Na is the number of neighbouring reference samples for CCLM after sample reduction according to the L0138 proposal. Specifically, a sample reduction method in the L0138 proposal is performing down-sampling on neighbouring reference samples after the neighbouring reference samples are acquired through the conventional technical solution.

TABLE 1

| Size of the second colour component block | $N_1$ | $N_2$ |
|---|---|---|
| 2 × 2 | 4 | 2 |
| 2 × n/n × 2(n > 2) | 4 | 4 |
| 4 × 4/4 × n/n × 4(n > 4) | 8 | 8 |
| 8 × 8/8 × n/n × 8(n > 8) | 16 | 8 |
| 16 × 16/16 × n/n × 16(n > 16) | 32 | 8 |
| 32 × 32 | 64 | 8 |

(d) Scheme of neighbouring reference sample down-sampling

For a non-square decoding block, a down-sampling scheme for the long side (illustrated in FIG. 4B) is provided in the VTM. As the abovementioned L0138 proposal, a down-sampled set obtained by further sample reduction is proposed in the proposal.

In the L0138 proposal, selection of neighbouring reference samples in a down-sampling process may influence the decoding prediction performance, and the decoding prediction performance corresponding to a subset of the neighbouring reference samples obtained by a default down-sampling solution in the VTM is not so ideal. Therefore, it is proposed in the L0138 proposal that another solution for selecting a subset of the neighbouring reference samples may be adopted during down-sampling. Specifically, in the conventional technical solution adopted in the VTM, when a long side of a non-square decoding block is down-sampled, sample selection is started from a leftmost edge for samples in an adjacent row corresponding to an upper side of the decoding block, and sample selection is started from an uppermost edge for samples in an adjacent column corresponding to a left side. A solution of starting sample selection from edges opposite to those in the conventional technical solution is proposed in the L0138 proposal, and may specifically refer to sample selection structure examples illustrated in FIG. 5A and FIG. 5B.

Figure 5A:
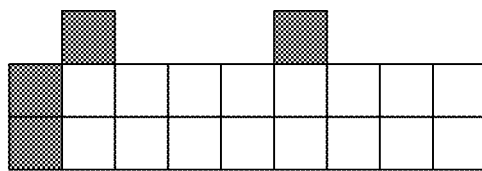
FIG. 5A and FIG. 5B are schematic structure diagrams of selecting neighbouring reference samples according to a conventional technical solution and an L0138 proposal in the related technical solution respectively.
Figure 5B:
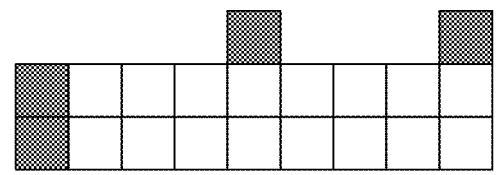

FIG. 5A illustrates a structure diagram of selecting neighbouring reference samples according to a conventional technical scheme in the related technical solution. As illustrated in FIG. 5A, sample selection for sampling is started from samples of the leftmost edge for the samples in the adjacent row corresponding to the long side of the decoding block. FIG. 5B illustrates a structure diagram of selecting neighbouring reference samples according to an L0138 proposal in the related technical solution. As illustrated in FIG. 5B, sample selection for sampling is started from samples of a rightmost edge for the samples in the adjacent row corresponding to the long side of the decoding block. Here, a sampling interval is the same as the conventional technical solution and will not be elaborated in the embodiment of the disclosure. With the sample selection scheme in the L0138 proposal, a value range of all neighbouring reference samples may be completely covered during model parameter calculation of CCLM. However, importance of each neighbouring reference sample is not considered, and consequently, the overall characteristic of the long side may still not be maximally represented on the premise of a limited number.

In the related technical solution, the operation complexity is considered on one hand. Searching 2N points for the maximum first colour component neighbouring reference value and the minimum first colour component neighbouring reference value to deduce the model parameters according to the principle that "two points determine a line" (referring to the formula (3)) is accepted in the VTM. Only two neighbouring reference samples are utilized in the solution, so that the operation complexity is greatly reduced, compared with that of model parameters of the least-square-based regression construction. However, the solution is still high in complexity mainly because the maximum and minimum in the set of neighbouring reference samples are required to be determined and 4N comparison operations are required to be executed to determine the maximum and the minimum. Moreover, if the length of the decoding block is greater, the number of the neighbouring reference samples thereof for CCLM is greater, which results in the number of times of searching for determining the maximum and the minimum to be greater, so that the operation complexity of the solution is still high. The prediction accuracy is considered on the other hand. If a correlation between a sample obtained by searching and a present decoding block is low in a process of searching the maximum and the minimum, it may be determined that the sample is a defective sample. In such case, if the two samples obtained by searching include a defective sample, the prediction model may have a relatively great model error. Therefore, the maximum and minimum-based model parameter construction method is relatively low in complexity but poor in robustness, and the decoding prediction performance is reduced to a certain extent.

Based on this, the latest L0138 proposal proposes the concept of a subset of the neighbouring reference samples. The abovementioned shortcomings are improved to a certain extent, namely not only is the number of the neighbouring reference samples reduced to further reduce the operation complexity, but also the samples at proper positions are selected (as illustrated in FIG. 5B) to slightly improve the decoding prediction performance. However, there is still room for improvement of the solution.

For improving the encoding and decoding prediction performance better, the embodiments of the disclosure provide a prediction method for decoding. A midpoint of at least one side of a block to be decoded is taken as a reference point, reference sample positions to be selected are determined according to a preset number of samples, neighbouring reference samples selected in consideration of both importance and dispersion are put in a subset of the neighbouring reference samples, and prediction decoding is performed on the block to be decoded based on the subset of the neighbouring reference samples. In such a manner, model parameters constructed based on the subset of the neighbouring reference samples are relatively accurate, so that the decoding prediction performance may be improved. Moreover, the subset of the neighbouring reference samples includes few samples, so that the search complexity is also reduced, and the bit rate is further reduced. The embodiments of the disclosure will be described below in combination with the drawings in detail.

Figure 6:
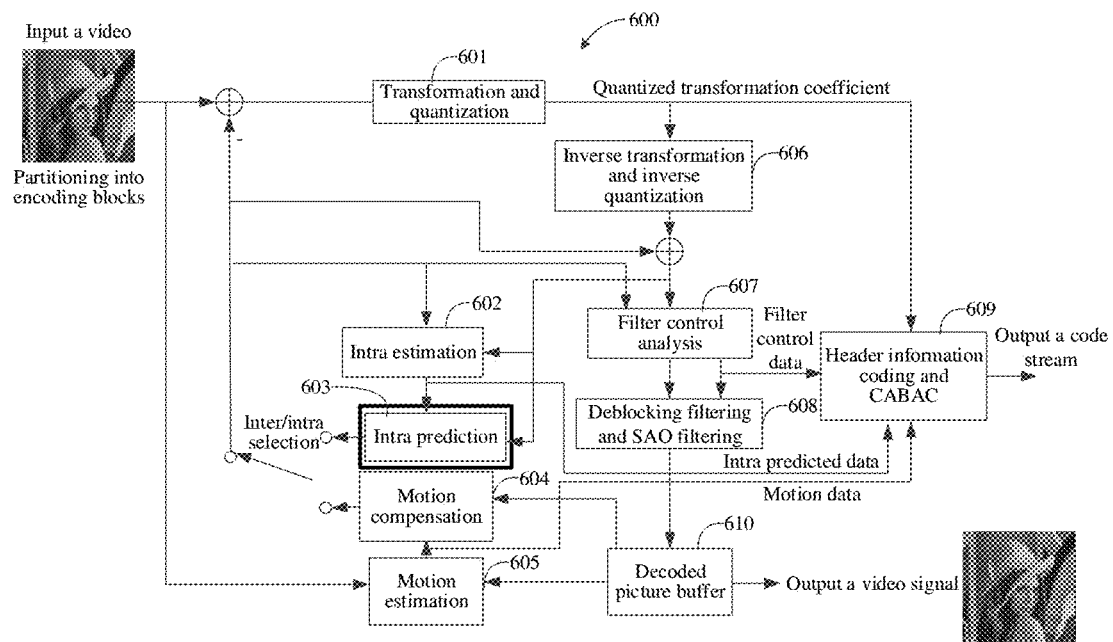
FIG. 6 is a schematic block diagram of a video coding system according to an embodiment of the disclosure.

FIG. 6 illustrates a composition block diagram example of a video coding system according to an embodiment of the disclosure. As illustrated in FIG. 6, the video coding system 600 includes components such as transformation and quantization 601, intra estimation 602, intra prediction 603, motion compensation 604, motion estimation 605, inverse transformation and inverse quantization 606, filter control analysis 607, deblocking filtering and Sample Adaptive Offset (SAO) filtering 608, header information coding and Context-based Adaptive Binary Arithmetic Coding (CABAC) 609 and decoded picture buffer 610. For an input original video signal, a video encoding block may be obtained by partitioning a Coding Tree Unit (CTU), and then residual sample information obtained by intra or inter prediction is processed through the transformation and quantization 601 to transform the video encoding block, including transforming the residual information from a sample domain to a transformation domain and quantizing an obtained transformation coefficient to further reduce a bit rate. The intra estimation 602 and the intra prediction 603 are configured to perform intra prediction on the video encoding block. Exactly, the intra estimation 602 and the intra prediction 603 are configured to determine an intra prediction mode to be used for encoding the video encoding block. The motion compensation 604 and the motion estimation 605 are configured to execute intra prediction coding on the received video encoding block relative to one or more blocks in one or more reference frames to provide time prediction information. Motion estimation executed by the motion estimation 605 is a process of generating a motion vector. The motion vector may be used to estimate motion of the video encoding block, and then the motion compensation 604 executes motion compensation based on the motion vector determined by the motion estimation 605. After the intra prediction mode is determined, the intra prediction 603 is further configured to provide selected intra predicted data for the header information coding and CABAC 609, and the motion estimation 605 also sends motion vector data determined by calculation to the header information coding and CAB AC 609. In addition, the inverse transformation and inverse quantization 606 is configured to reconstruct the video encoding block, namely a residual block is reconstructed in the sample domain. An artifact with a blocking effect in the reconstructed residual block is removed through the filter control analysis 607 and the deblocking filtering and SAO filtering 608 and then the reconstructed residual block is added to a predictive block in a frame of the decoded picture buffer 610 to generate a reconstructed video encoding block. The header information coding and CABAC 609 is configured to encode various coding parameters and quantized transformation coefficients. In a CABAC-based coding algorithm, a context content may encode information indicating the determined intra prediction mode based on adjacent encoding blocks to output a code stream of the video signal. The decoded picture buffer 610 is configured to store the reconstructed video encoding block for prediction reference. As video pictures are encoded, new reconstructed video encoding blocks may be continuously generated, and these reconstructed video encoding blocks may be stored in the decoded picture buffer 610.

Figure 7:
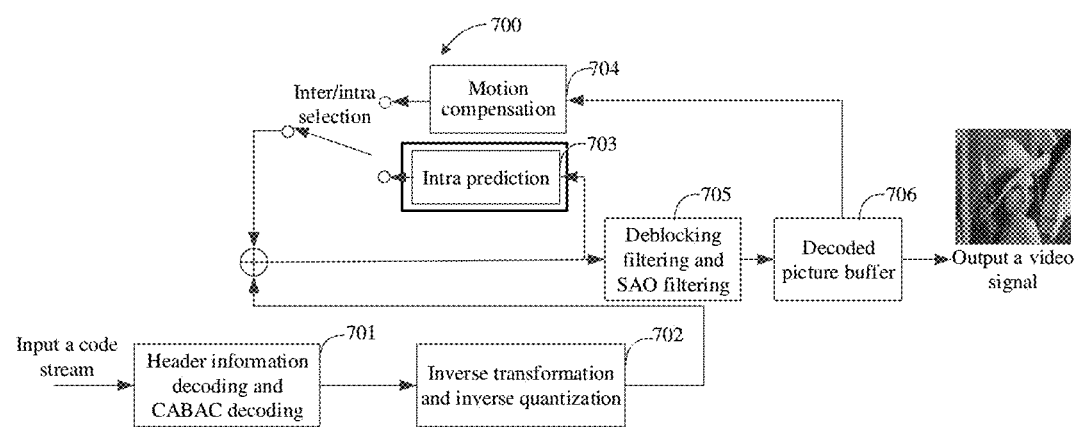
FIG. 7 is a schematic block diagram of a video decoding system according to an embodiment of the disclosure.

FIG. 7 illustrates a composition block diagram example of a video decoding system according to an embodiment of the disclosure. As illustrated in FIG. 7, the video decoding system 700 includes components such as header information decoding and CABAC decoding 701, inverse transformation and inverse quantization 702, intra prediction 703, motion compensation 704, deblocking filtering and SAO filtering 705 and decoded picture buffer 706. After coding processing illustrated in FIG. 6 is performed on an input video signal, a code stream of the video signal is output. The code stream is input to the video decoding system 700, and is processed through the header information decoding and CABAC decoding 701 at first to obtain a decoded transformation coefficient. The transformation coefficient is processed through the inverse transformation and inverse quantization 702 to generate a residual block in a sample domain. The intra prediction 703 may be configured to generate predicted data of a present video decoding block based on a determined intra prediction mode and data of a previous decoded block from a present frame or picture. The motion compensation 704 analyzes a motion vector and another associated syntactic element to determine prediction information for the video decoding block and generates a predictive block of the video decoding block that is presently decoded by use of the prediction information. The residual block from the inverse transformation and inverse quantization 702 and the corresponding predictive block generated by the intra prediction 703 or the motion compensation 704 are summed to form a decoded video block. An artifact with a blocking effect in the decoded video signal may be removed through the deblocking filtering and SAO filtering 705 to improve the video quality. Then, the decoded video block is stored in the decoded picture buffer 706. The decoded picture buffer 706 stores a reference picture for subsequent intra prediction or motion compensation and also outputs a video signal, namely the recovered original video signal is obtained.

The embodiments of the disclosure are mainly applied to intra prediction 603 illustrated in FIG. 6 and intra prediction 703 illustrated in FIG. 7. That is, the embodiments of the disclosure may be applied to a coding system and may also be applied to a decoding system. However, no specific limits are made thereto in the embodiments of the disclosure.

Figure 8:
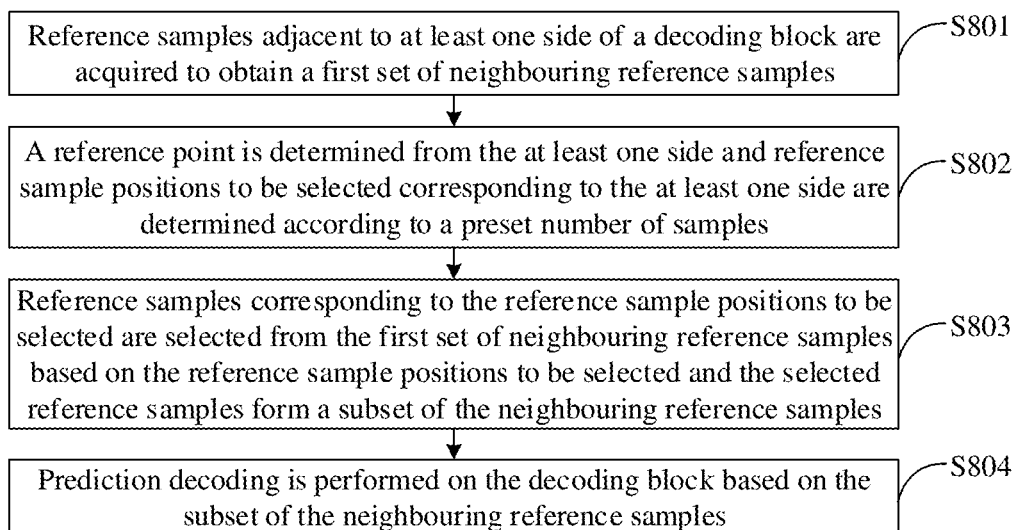
FIG. 8 is a schematic flowchart of a prediction method for decoding according to an embodiment of the disclosure.

Based on the application scenario example illustrated in FIG. 6 or FIG. 7, FIG. 8 illustrates a flowchart of a prediction method for decoding according to an embodiment of the disclosure. The method may include the following operations.

In S801, reference samples adjacent to at least one side of a decoding block are acquired to obtain a first set of neighbouring reference samples.

In S802, a reference point is determined from the at least one side, and reference sample positions to be selected corresponding to the at least one side are determined according to a preset number of samples.

In S803, reference samples corresponding to the reference sample positions to be selected are selected from the first set of neighbouring reference samples based on the reference sample positions to be selected, and the selected reference samples form a subset of the neighbouring reference samples.

In S804, prediction decoding is performed on the decoding block based on the subset of the neighbouring reference samples.

It is to be noted that the decoding block (block to be decoded) is a decoding block that second colour component prediction or third colour component prediction is presently required to be performed on. The at least one side of the decoding block may refer to an upper side of the decoding block, may also refer to a left side of the decoding block and may even refer to the upper side and left side of the decoding block. No specific limits are made in the embodiment of the disclosure.

It is also to be noted that the reference point may be a midpoint of the at least one side, may also be a first reference sample position on the left of the midpoint of the at least one side, may also be a first reference sample position on the right of the midpoint of the at least one side and may even be another reference sample position of the at least one side. No specific limits are made in the embodiment of the disclosure.

In the embodiment of the disclosure, the prediction method for decoding of the embodiment of the disclosure may also be applied to a coding system. A subset of the neighbouring reference samples may be constructed in the coding system to improve the video picture coding prediction performance and improve the coding compression efficiency to reduce the coding rate. The following descriptions are made only with construction of the subset of the neighbouring reference samples in a decoding system as an example.

In the embodiment of the disclosure, the reference samples adjacent to the at least one side of the decoding block are acquired at first to obtain the first set of neighbouring reference samples. Then, the reference point is determined from the at least one side, and the reference sample positions to be selected corresponding to the at least one side are determined according to the preset number of samples. Next, the reference samples corresponding to the reference sample positions to be selected are selected from the first set of the neighbouring reference samples based on the reference sample position to be selected, and the selected reference samples form the subset of the neighbouring reference samples. Finally, prediction decoding is performed on the decoding block based on the subset of the neighbouring reference samples. In the embodiment of the disclosure, not all reference samples adjacent to the upper side or left side of the decoding block participate in a search operation for decoding prediction, and instead, neighbouring reference samples at proper positions are selected in consideration of both importance and dispersion to form the subset of the neighbouring reference samples. In this way, the subset of the neighbouring reference samples includes few samples, the search complexity may be reduced, the decoding prediction performance may also be improved, and the bit rate is further reduced.

In some embodiments, the operation that the reference point is determined from the at least one side includes the following operation.

A midpoint of the at least one side is determined based on a length of the at least one side, and the midpoint of the at least one side is determined as the reference point.

In some embodiments, when the reference point is the midpoint of the at least one side, the operation that the reference point is determined from the at least one side includes the following operation.

Based on the length of the at least one side, if the midpoint of the at least one side is at a middle position between two reference samples, a first reference sample position on the right of the middle position is determined as the reference point of the at least one side, or a first reference sample position on the left of the middle position is determined as the reference point of the at least one side.

It is to be noted that, considering that the importance of the reference sample adjacent to the at least one side of the decoding block is correlated with a corresponding position thereof, for making the reference sample in the subset of the neighbouring reference samples representative of a characteristic of the whole adjacent side, it is necessary to select a reference sample at a central position of the side as much as possible, so as to remove a sample with relatively low importance (for example, reference samples on two edges of the side). In the embodiment of the disclosure, if descriptions are made with the upper side of the decoding block as an example, a first reference sample position on the right or left of a middle position may be determined as a reference point of the side.

Figure 9:
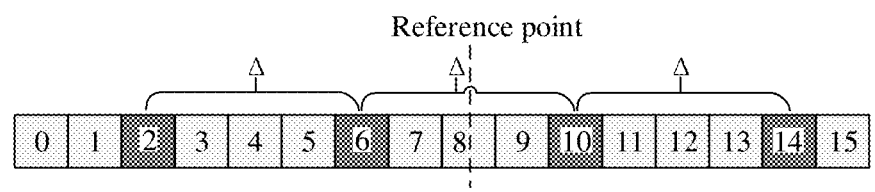
FIG. 9 is a schematic structure diagram of selecting a subset of the neighbouring reference samples corresponding to an upper side of a decoding block according to an embodiment of the disclosure.

Exemplarily, referring to FIG. 9, a structure diagram of selecting a subset of the neighbouring reference samples corresponding to an upper side of a decoding block according to an embodiment of the disclosure is illustrated. As illustrated in FIG. 9, for all reference samples distributed on the upper side of the decoding block, a midpoint of the side is selected as a center (the dotted position illustrated in FIG. 9), and reference samples are selected by taking the center as a reference point. If a length of the upper side of the decoding decoding block is 16 and the preset number of samples is 4, it may be obtained that a sampling interval $\Delta$ is 16/4=4. In such case, since the length of the upper side is 16, it may be determined that the midpoint is between 7 and 8, that is, 7 or 8 may be selected as the midpoint. In FIG. 9, for example, 8 is selected as the reference point. Since the preset number of samples is 4, it may be determined that reference sample positions to be selected (as illustrated by the gray points in FIG. 9) are 2, 6, 10 and 14. The corresponding reference samples may be selected according to these reference sample positions to form the subset of the neighbouring reference samples.

In some embodiments, when the reference point is the midpoint of the at least one side, the operation that the reference point is determined from the at least one side includes the following operation.

Based on the length of the at least one side, if the midpoint of the at least one side is at a middle position between two reference samples, a first reference sample position lower than the middle position is determined as the reference point of the at least one side, or a first reference sample position upper than the middle position is determined as the reference point of the at least one side.

It is to be noted that, considering that the importance of the reference sample adjacent to the at least one side of the decoding block is correlated with a corresponding position thereof, for making the reference sample in the subset of the neighbouring reference samples representative of a characteristic of the whole adjacent side, it is necessary to select a reference sample at a central position of the side as much as possible to remove a sample with relatively low importance (for example, reference samples on two edges of the side). In the embodiment of the disclosure, if descriptions are made with the left side of the decoding block as an example, a first reference sample position lower or upper than a middle position may be determined as a reference point of the side.

Figure 10:
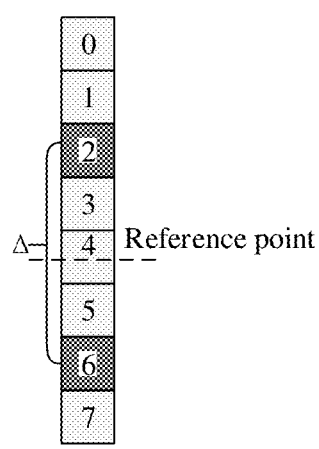
FIG. 10 is a schematic structure diagram of selecting a subset of the neighbouring reference samples corresponding to a left side of a decoding block according to an embodiment of the disclosure.

Exemplarily, referring to FIG. 10, a structure diagram of selecting a subset of the neighbouring reference samples corresponding to a left side of a block to be decoded according to an embodiment of the disclosure is illustrated. As illustrated in FIG. 10, for all reference samples distributed on the left side of the block to be decoded, a midpoint of the side is selected as a center (the dotted position illustrated in FIG. 10), and reference samples are selected by taking the center as a reference point. If a length of the upper side of the decoding block is 8 and the preset number of samples is 2, it may be obtained that a sampling interval $\Delta$ is 8/2=4. In such case, since the length of the left side is 8, it may be determined that the midpoint is between 3 and 4, that is, 3 or 4 may be selected as the midpoint. In FIG. 10, for example, 4 is selected as the reference point. Since the preset number of samples is 2, it may be determined that reference sample positions to be selected (as illustrated by the gray points in FIG. 10) are 2 and 6. The corresponding reference samples may be selected according to these reference sample positions to form the subset of the neighbouring reference samples.

Figure 11:
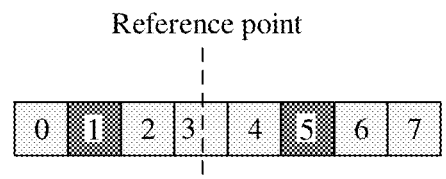
FIG. 11 is another schematic structure diagram of selecting a subset of the neighbouring reference samples corresponding to an upper side of a decoding block according to an embodiment of the disclosure.

During a practical application, since the length of the left side or upper side of the decoding block is an integral multiple of 2, the middle position of the left side or upper side of the decoding block is between two points. In the example illustrated in FIG. 9, the first sample on the right of the middle position is determined as the midpoint of the side. However, the first sample on the left of the middle position may also be determined as the midpoint of the side in the embodiment of the disclosure, as illustrated in the structure example of FIG. 11. In FIG. 11, the first sample (for example, 3 in FIG. 11) on the left of the middle position is determined as the midpoint of the side. Since the preset number of samples is 2, it may be determined that the reference sample positions to be selected (as illustrated by the gray points in FIG. 11) are 1 and 5. The corresponding reference samples may also be selected according to these reference sample positions to form the subset of the neighbouring reference samples. Therefore, in the embodiment of the disclosure, for the upper side of the decoding block, the first sample on the right of the middle position may be determined as the midpoint of the side, and the first sample on the left of the middle position may also be determined as the midpoint of the side. No specific limits are made in the embodiment of the disclosure. In addition, for the left side of the decoding block, the first sample lower than the middle position may be determined as the midpoint of the side, and the first sample upper than the middle position may also be determined as the midpoint of the side. No specific limits are made in the embodiment of the disclosure.

Unless otherwise specified, the following descriptions are made with the upper side of the decoding block as an example. However, the prediction method of the embodiment of the disclosure is also applied to the left side of the decoding block and even another side of the decoding block.

It is to be understood that, without considering existence of the reference samples adjacent to the left side or upper side of the decoding block, the subset of the neighbouring reference samples may also be constructed according to a formula (4) and a formula (5):

$$\Delta = \text{length}/(N_2/2) \quad (4).$$

$$\text{shift} = \Delta/2 \quad (5).$$

$\Delta$ represents the sampling interval, length represents the number of reference samples in a row adjacent to the upper side of the decoding block or the number of reference samples in a column adjacent to the left side of the decoding block, $N_2$ represents the expected number (generally ½ for each of the left side and the upper side, but no specific limits are made in the embodiment of the disclosure) of neighbouring reference samples, forming the subset of the neighbouring reference samples, of the decoding block, and shift represents a starting point position for selection of the reference samples. Here, when the middle position of the left side or upper side of the decoding block is between two points, if the first sample on the right of the middle position is determined as the midpoint of the side, the starting point position is shift=$\Delta/2$, and if the first sample on the left of the middle position is determined as the midpoint of the side, the starting point position is shift=$\Delta/2-1$.

Exemplarily, taking the upper side illustrated in FIG. 9 as an example, length is equal to 16 and $N_2$ is equal to 8, assuming ½ for each of the left side and the upper side, namely the preset number of samples of the upper side is 4, Δ=length/($N_2$/2)=4 and shift=Δ/2=2 are calculated according to the formula (4) and the formula (5) respectively, namely the starting point position is 2 and the sampling interval is 4. The reference sample positions to be selected, for example, 2, 6, 10 and 14, may be determined at first, and furthermore, the corresponding reference samples may be selected to form the subset of the neighbouring reference samples. It is to be noted that the preset number of samples corresponding to the left side and the preset number of samples corresponding to the upper side may be same or different, and no specific limits are made in the embodiment of the disclosure.

In addition, the embodiment of the disclosure also provides a scheme for determining the preset number of samples, as illustrated in Table 2. In such case, in the embodiment of the disclosure, $N_2$' in Table 2 may also be substituted into the formula (4) and the formula (5) instead of $N_2$ for calculation, so that the formed subset of the neighbouring reference samples is more accurate, thereby improving the decoding prediction performance.

Table 2 illustrates a relationship table between a size of a second colour component block corresponding to a decoding block and the number of neighbouring reference samples according to the embodiment of the disclosure. In Table 2, N represents a length of a short side of the decoding block, $N_1$ represents the number of the neighbouring reference samples in the conventional technical solution, Na is the number of the neighbouring reference samples in the L0138 proposal, and $N_2$' is the number of the neighbouring reference samples in the embodiment of the disclosure. It can be seen according to Table 2 that, when the length of the short side of the decoding block is less than or equal to 4, the subset of the neighbouring reference samples includes four reference samples, and when the length of the short side of the decoding block is greater than 4, the subset of the neighbouring reference samples may include eight reference samples.

TABLE 2

| Size of the second colour component block | Length of the short side | $N_1$ | $N_2$ | $N_2$' |
|---|---|---|---|---|
| 2 × n/n × 2(n ≥ 2) | 2 | 4 | 2 | 4 |
| 4 × n/n × 4(n ≥ 4) | 4 | 8 | 4 | 4 |
| 8 × n/n × 8(n ≥ 8) | 8 | 16 | 8 | 8 |
| 16 × n/n × 16(n ≥ 16) | 16 | 32 | 8 | 8 |
| 32 × 32 | 32 | 64 | 8 | 8 |

In some embodiments, the operation that the reference point is determined from the at least one side and the reference sample positions to be selected corresponding to the at least one side are determined according to the preset number of samples includes the following operations.

A first sampling interval is calculated based on the preset number of samples and the length of the at least one side.

The midpoint of the at least one side is determined as the reference point, and the reference sample positions to be selected corresponding to the at least one side are determined according to the first sampling interval.

In at least one embodiment, the operation that the midpoint of the at least one side is determined as the reference point and the reference sample positions to be selected corresponding to the at least one side are determined according to the first sampling interval includes the following operations.

A midpoint value of the at least one side is calculated based on the length of the at least one side.

Reference sample positions are calculated according to the midpoint value and the first sampling interval.

When the midpoint value is non-integral, a reference sample position on a left side of the midpoint value is rounded down, the rounded reference sample position is determined as a reference sample position to be selected; and a reference sample position on a right side of the midpoint value is rounded up, and the rounded reference sample position is determined as a reference sample position to be selected.

In at least one embodiment, the operation that the midpoint of the at least one side is determined as the reference point and the reference sample positions to be selected corresponding to the at least one side are determined according to the first sampling interval includes the following operations.

A midpoint value of the at least one side is calculated based on the length of the at least one side.

Reference sample positions are calculated according to the midpoint value and the first sampling interval.

When the midpoint value is non-integral, a reference sample position on the left side of the midpoint value is rounded up and the rounded reference sample position is determined as a reference sample position to be selected; and, a reference sample position on the right side of the midpoint value is rounded down and the rounded reference sample position is determined as a reference sample position to be selected.

It is to be noted that, according to a preset number of samples and a length of a side of the decoding block, a first sampling interval corresponding to the side may be calculated. In addition, since the length of the left side or upper side of the decoding block is an integral multiple of 2, the middle position of the left side or upper side of the decoding block is between two points, and in such case, a calculated midpoint value is non-integral and a calculated reference sample position is also non-integral. However, if the length of the left side or upper side of the decoding block is not an integral multiple of 2, the middle position of the left side or upper side of the decoding block may not be between two points, and in such case, the calculated midpoint value is integral and the calculated reference sample position is also integral. That is, the calculated midpoint value may be integral and may also be non-integral, and correspondingly, the calculated reference sample position may be integral and may also be non-integral. No specific limits are made in the embodiment of the disclosure.

Therefore, when the calculated midpoint value is integral, the calculated reference sample position is correspondingly integral, and in such case, the calculated reference sample position may be directly determined as the reference sample position to be selected. When the calculated midpoint is non-integral, the calculated reference sample position is correspondingly non-integral, and in such case, the reference sample position to be selected may be determined by rounding-up or rounding-down.

Figure 12:
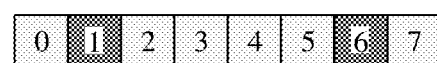
FIG. 12 is another schematic structure diagram of selecting a subset of the neighbouring reference samples corresponding to an upper side of a decoding block according to an embodiment of the disclosure.
Figure 13:
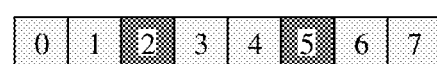
FIG. 13 is another schematic structure diagram of selecting a subset of the neighbouring reference samples corresponding to an upper side of a decoding block according to an embodiment of the disclosure.

For example, taking the upper side illustrated in FIG. 11 as an example, if the preset number of samples is 2 and the length of the upper side is 8, it may be determined that the first sampling interval is 4. The length of the upper side is 8, namely the middle position of the upper side is between two points. Since arrangement of reference samples starts from 0 and ends at 7, it may be obtained by calculation that a practical position of the midpoint of the upper side is 3.5. Since the first sampling interval is 4, reference sample positions 1.5 and 5.5 may be obtained by shifting 4/2 points on the left and right sides of the midpoint respectively. In such case, the reference sample position on the left side of the midpoint value may be rounded down to obtain one reference sample position to be selected 1, and the reference sample position on the right side of the midpoint value may be rounded up to obtain the other reference sample position to be selected 6. The method may also be called a rounding-out scheme, as illustrated in FIG. 12. In such case, reference samples corresponding to the positions 1 and 6 may form the subset of the neighbouring reference samples. In addition, when the reference sample positions 1.5 and 5.5 are calculated, the reference sample position on the left side of the midpoint value may also be rounded up to obtain one reference sample position to be selected 2, and the reference sample position on the right side of the midpoint value may be rounded down to obtain the other reference sample position to be selected 5. The method may also be called a rounding-in scheme, as illustrated in FIG. 13. In such case, reference samples corresponding to the positions 2 and 5 may form the subset of the neighbouring reference samples.

In some embodiments, after the operation that the first sampling interval is calculated, the method further includes the following operations.

The first sampling interval is regulated to obtain a second sampling interval.

The midpoint of the at least one side is determined as the reference point, and the reference sample positions to be selected corresponding to the at least one side are determined according to the second sampling interval.

In some embodiments, after the operation that the second sampling interval is obtained, the method further includes the following operation.

The midpoint of the at least one side is determined as the reference point, a reference sample position to be selected corresponding to a left side of the reference point is determined according to the first sampling interval, and a reference sample position to be selected corresponding to a right side of the reference point is determined according to the second sampling interval.

It is to be noted that, after the first sampling interval is calculated, the first sampling interval may further be finely regulated, for example, the first sampling interval is added or subtracted by 1, to obtain the second sampling interval. For example, if the first sampling interval is 4, the second sampling interval obtained by regulation may be 3 or 5. In the embodiment of the disclosure, regulation of the first sampling interval may be slight (for example, adding 1 or subtracting 1) regulation, but a specific setting of a regulation amplitude is not specifically limited in the embodiment of the disclosure.

In addition, after the reference point of the at least one side of the decoding block is determined, uniform sampling may be performed according to the first sampling interval or the second sampling interval, or nonuniform sampling may be performed according to the first sampling interval and the second sampling interval. The reference sample positions to be selected determined after sampling may be distributed symmetrically on the two sides of the reference point and may also be distributed asymmetrically on the two sides of the reference point. No specific limits are made in the embodiment of the disclosure.

In some embodiments, the operation that the reference point is determined from the at least one side and the reference sample positions to be selected corresponding to the at least one side is determined according to the preset number of samples includes the following operation.

A midpoint of the at least one side is determined as the reference point, and continuous reference sample positions near the reference point are determined as reference sample positions to be selected according to the preset number of samples. The reference point is at a middle position of the reference sample positions to be selected.

Figure 14:
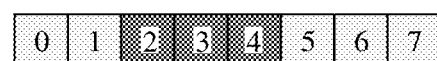
FIG. 14 is another schematic structure diagram of selecting a subset of the neighbouring reference samples corresponding to an upper side of a decoding block according to an embodiment of the disclosure.

It is to be noted that, since a reference sample at a middle position is correlated more with a first colour component reconstructed value of a decoding block in neighbouring reference samples, continuous reference sample positions having the preset number of samples near the middle position may be determined as reference sample positions to be selected. This method may be called a middle-position-based continuous sample selection scheme, as illustrated in FIG. 14. In such case, reference samples corresponding to the positions 2, 3 and 4 may form the subset of the neighbouring reference samples.

It can be understood that, if reference sample positions in a row/column adjacent to the upper side or left side of the decoding block are numbered from 0, the number of neighbouring reference samples in the formed subset of the neighbouring reference samples and the corresponding reference sample positions to be selected in the embodiment are illustrated in Table 3.

TABLE 3

| Length of the left side or upper side of the decoding block | Reference sample positions to be selected | Preset number of samples |
| --- | --- | --- |
| 2 | 0, 1 | 2 |
| 4 | 1, 2 | 2 |
| 8 | 2, 3, 4 (or 3, 4, 5) | 3 |
| 16 | 6, 7, 8, 9 | 4 |
| 32 | 13, 14, 15, 16, 17, 18, 19, 20 | 8 |

In the embodiment, the continuous reference sample positions having the preset number of samples near the middle position are determined as the reference sample positions to be selected, so as to form the subset of the neighbouring reference samples. Prediction decoding is performed according to the subset of the neighbouring reference samples, which may still reduce the bit rate and improve the decoding gain based on the L0138 proposal, thereby improving the decoding prediction performance.

In some embodiments, the decoding block includes a square decoding block or a non-square decoding block.

Furthermore, in some embodiments, when the decoding block is a non-square decoding block, the method further includes the following operations.

A long side of the decoding block and a third sampling interval corresponding to the long side are determined based on the length of the at least one side of the decoding block.

A reference sample corresponding to an ending position of the long side is deleted, initial offsetting is performed according to a preset offset on the long side that the reference sample is deleted from, an offset reference sample position is determined as a starting point, and the long side that the reference sample is deleted from is sampled according to the third sampling interval to determine reference sample positions to be selected corresponding to the long side.

It is to be noted that the embodiment of the disclosure may be applied to a square decoding block and may also be applied to a non-square decoding block. No specific limits are made in the embodiment of the disclosure.

It is also to be noted that, when the decoding block is a non-square decoding block, one of the left side and upper side of the decoding block is a long side and the other is a short side. The third sampling interval corresponding to the long side may be obtained according to a ratio of the long side to the short side. Before the long side is sampled, the reference sample corresponding to the ending position of the long side may be deleted at first, then initial offsetting is performed on the long side that the reference sample is deleted from according to the preset offset, the offset reference sample position is taken as the starting point, and then the long side that the reference sample is deleted from is sampled to determine reference sample positions to be selected corresponding to the long side. In the embodiment of the disclosure, the preset offset may be ½ of the third sampling interval and may also be another value. No specific limits are made in the embodiment of the disclosure.

Exemplarily, in the related technical solution, reference sample sampling for the long side of the non-square decoding block is illustrated in FIG. 4B. In FIG. 4B, it may be determined according to the ratio of the long side to the short side that the third sampling interval is 4. A first reference sample position on the left of the long side is determined as the starting point, and then reference samples in the same count as neighbouring reference samples of the short side are selected according to the third sampling interval. In such case, the sampled reference samples are on the left and may not cover the characteristic of the whole long side. Therefore, in the embodiment, initial offsetting is performed on the long side of the non-square decoding block at first to ensure that the sampled reference samples may cover the characteristic of the whole long side. For example, the preset offset is ½ of the third sampling interval, namely the preset offset is 2, that is, sampling starts from 2 in the embodiment. In such case, the formed subset of the neighbouring reference samples may cover the characteristic of the whole long side better.

In some embodiments, the operation that the reference point is determined from the at least one side and the reference sample positions to be selected corresponding to the at least one side is determined according to the preset number of samples includes the following operations.

Reference samples corresponding to a starting position and ending position of the at least one side are deleted to obtain a second set of neighbouring reference samples.

A midpoint of the at least one side is determined as the reference point, and the reference sample positions to be selected are determined based on the second set of the neighbouring reference samples and the preset number of samples.

It is to be noted that, in the embodiment of the disclosure, the reference samples may be directly selected based on the midpoint of the left side or upper side of the decoding block as the reference point to form the subset of the neighbouring reference samples. In the embodiment of the disclosure, reference samples respectively corresponding to a starting position and ending position (for example, for the upper side, the starting position is a left edge position and the ending position is a right edge position; and for the left side, the starting position is an upper edge position and the ending position is a lower edge position) corresponding to the left side/upper side of the decoding block may be deleted at first, with reference samples of a middle part reserved, and then the selected reference samples form the subset of the neighbouring reference samples.

It is also to be noted that the preset number of samples may be any value. Generally, the preset number of samples is less than $N_1$ in Table 2. However, the embodiment of the disclosure is not limited to that the preset number of samples is equal to $N_2$ or $N_2'$. The preset number of samples is less than $N_1$ in Table 2, so that the search complexity of the reference samples may be reduced to improve the decoding prediction performance. Specifically, values of A and shift in the formula (4) and the formula (5) may be changed to implement determination of reference sample positions to be selected based on different starting points and sampling intervals and further select corresponding reference samples to form the subset of the neighbouring reference samples.

In some embodiments, the operation that prediction decoding is performed on the decoding block based on the subset of the neighbouring reference samples includes the following operations.

Model parameters are determined based on the subset of the neighbouring reference samples.

A prediction model is established according to the model parameters. The prediction model represents a prediction relationship between a first colour component and a second colour component corresponding to each sample in the decoding block.

Prediction decoding is performed on the decoding block based on the prediction model.

It is to be noted that, after the subset of the neighbouring reference samples is obtained, the model parameters α and β may be constructed, then the prediction model may be established according to the formula (1) and prediction decoding may be performed on the decoding block according to the prediction model. Both importance and dispersion are considered for neighbouring reference samples included in the subset of the neighbouring reference samples, so that the constructed model parameter is more accurate, thereby improving the decoding prediction performance and further reducing the bit rate.

The above embodiments provide a prediction method for decoding. The reference samples adjacent to the at least one side of the decoding block are acquired to obtain the first set of neighbouring reference samples. The reference point is determined from the at least one side, and the reference sample positions to be selected corresponding to the at least one side is determined according to the preset number of samples. The reference samples corresponding to the reference sample positions to be selected are selected from the first set of neighbouring reference samples based on the reference sample positions to be selected, and the selected reference samples form the subset of the neighbouring reference samples. Prediction decoding is performed on the decoding block based on the subset of the neighbouring reference samples. Both importance and dispersion are considered for the neighbouring reference samples in the subset of the neighbouring reference samples, and the subset of the neighbouring reference samples includes few samples, so that the search complexity is reduced, the video picture decoding prediction performance is improved, and the bit rate is further reduced.

Figure 15:
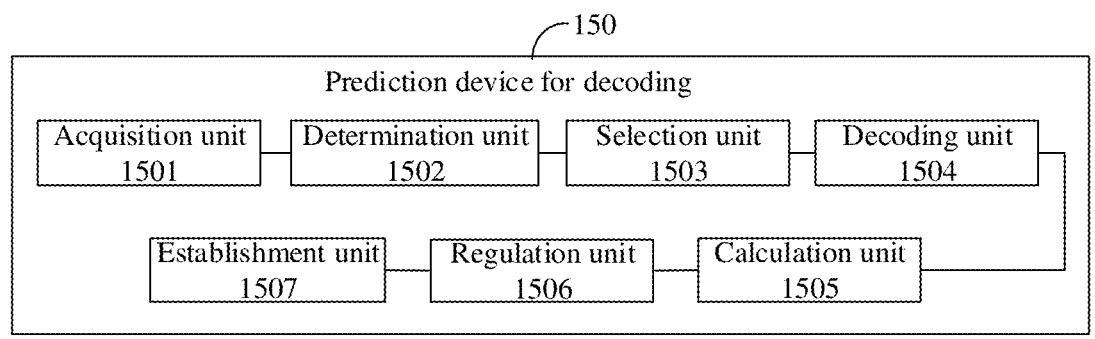
FIG. 15 is a schematic structure diagram of a prediction device for decoding according to an embodiment of the disclosure.

Based on the same inventive concept of the technical solution illustrated in FIG. 8, FIG. 15 illustrates a structure diagram of a prediction device for decoding 150 according to an embodiment of the disclosure. The prediction device for decoding 150 may include an acquisition unit 1501, a determination unit 1502, a selection unit 1503 and a decoding unit 1504.

The acquisition unit 1501 is configured to acquire reference samples adjacent to at least one side of a decoding block to obtain a first set of neighbouring reference samples.

The determination unit 1502 is configured to determine a reference point from the at least one side and determine reference sample positions to be selected corresponding to the at least one side according to a preset number of samples.

The selection unit 1503 is configured to select reference samples corresponding to the reference sample positions to be selected from the first set of the neighbouring reference samples based on the reference sample positions to be selected and form a subset of the neighbouring reference samples using the selected reference samples.

The decoding unit 1504 is configured to perform prediction decoding on the decoding block based on the subset of the neighbouring reference samples.

In the solution, the determination unit 1502 is specifically configured to, based on a length of the at least one side, if a midpoint of the at least one side is at a middle position between two reference samples, determine a first reference sample position on the right of the middle position as the reference point of the at least one side or determine a first reference sample position on the left of the middle position as the reference point of the at least one side.

In the solution, the determination unit 1502 is specifically configured to, based on the length of the at least one side, if the midpoint of the at least one side is at a middle position between two reference samples, determine a first reference sample position lower than the middle position as the reference point of the at least one side or determine a first reference sample position upper than the middle position as the reference point of the at least one side.

In the solution, referring to FIG. 15, the prediction device for decoding 150 further includes a calculation unit 1505, configured to calculate a first sampling interval based on the preset number of samples and the length of the at least one side.

The determination unit 1502 is specifically configured to determine the midpoint of the at least one side as the reference point and determine the reference sample positions to be selected corresponding to the at least one side according to the first sampling interval.

In the solution, the calculation unit 1505 is further configured to calculate a midpoint value of the at least one side based on the length of the at least one side and calculate reference sample positions according to the midpoint value and the first sampling interval.

The determination unit 1502 is specifically configured to, when the midpoint value is non-integral, round down a reference sample position on a left side of the midpoint value and determine the rounded reference sample position as a reference sample position to be selected, round up a reference sample position on a right side of the midpoint value and determine the rounded reference sample position as a reference sample position to be selected.

In the solution, the calculation unit 1505 is further configured to calculate the midpoint value of the at least one side based on the length of the at least one side and calculate reference sample positions according to the midpoint value and the first sampling interval.

The determination unit 1502 is specifically configured to, when the midpoint value is non-integral, round up a reference sample position on the left side of the midpoint value and determine the rounded reference sample position as a reference sample position to be selected, round down a reference sample position on the right side of the midpoint value and determine the rounded reference sample position as a reference sample position to be selected.

In the solution, referring to FIG. 15, the prediction device for decoding 150 further includes a regulation unit 1506, configured to regulate the first sampling interval to obtain a second sampling interval.

The determination unit 1502 is further configured to determine the midpoint of the at least one side as the reference point and determine the reference sample positions to be selected corresponding to the at least one side according to the second sampling interval.

In the solution, the determination unit 1502 is further configured to determine the midpoint of the at least one side as the reference point, determine a reference sample position to be selected corresponding to a left side of the reference point according to the first sampling interval and determine a reference sample position to be selected corresponding to a right side of the reference point according to the second sampling interval.

In the solution, the determination unit 1502 is further configured to determine the midpoint of the at least one side as the reference point and determine continuous reference sample positions near the reference point as reference sample positions to be selected according to the preset number of samples. The reference point is at a middle position of the reference sample positions to be selected.

In the solution, the decoding block includes a square decoding block or a non-square decoding block.

In the solution, the acquisition unit 1501 is further configured to delete reference samples corresponding to a starting position and ending position of the at least one side to obtain a second set of neighbouring reference samples.

The determination unit 1502 is further configured to determine the midpoint of the at least one side as the reference point and determine the reference sample positions to be selected based on the second set of the neighbouring reference samples and the preset number of samples.

In the solution, referring to FIG. 15, the prediction device for decoding 150 further includes an establishment unit 1507, configured to determine model parameters based on the subset of the neighbouring reference samples and establish a prediction model according to the model parameters. The prediction model represents a prediction relationship between a first colour component and a second colour component corresponding to each sample in the decoding block.

The decoding unit 1504 is specifically configured to perform prediction decoding on the decoding block based on the prediction model.

It can be understood that, in the embodiment, "unit" may be part of a circuit, part of a processor, part of a program or software and the like, of course, may also be modular and may also be non-modular. In addition, each component in the embodiment may be integrated into a processing unit, each unit may also exist independently, and two or more than two units may also be integrated into a unit. The integrated unit may be implemented in a hardware form and may also be implemented in form of software function module.

When implemented in form of software function module and sold or used as an independent product, the integrated unit may be stored in a computer-readable storage medium. Based on such an understanding, the technical solution of the embodiment substantially or parts making contributions to the conventional art or all or part of the technical solution may be embodied in form of software product, and the computer software product is stored in a storage medium, including a plurality of instructions configured to enable a computer device (which may be a personal computer, a server, a network device or the like) or a processor to execute all or part of the operations of the method in the embodiment. The storage medium includes: various media capable of storing program codes such as a U disk, a mobile hard disk, a Read Only Memory (ROM), a Random Access Memory (RAM), a magnetic disk or an optical disk.

Therefore, the embodiment provides a computer storage medium, which stores a decoding prediction program. The decoding prediction program is executed by at least one processor to implement the operations of the method in the technical solution illustrated in FIG. 8.

Figure 16:
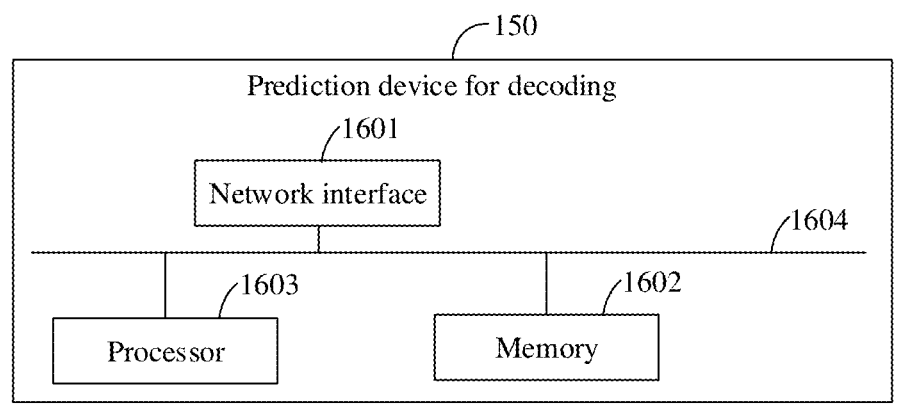
FIG. 16 is a schematic hardware structure diagram of a prediction device for decoding according to an embodiment of the disclosure.

Based on the composition of the prediction device for decoding 150 and the computer storage medium, FIG. 16 illustrates a specific hardware structure example of the prediction device for decoding 150 provided in the embodiment of the disclosure, which may include a network interface 1601, a memory 1602 and a processor 1603. Each component is coupled together through a bus system 1604. It can be understood that the bus system 1604 is configured to implement connection communication among these components. The bus system 1604 includes a data bus and further includes a power bus, a control bus and a state signal bus. However, for clear description, various buses in FIG. 16 are marked as the bus system 1604. The network interface 1601 is configured to receive and send a signal in a process of receiving and sending information with another external network element.

The memory 1602 is configured to store a computer program capable of running in the processor 1603.

The processor 1603 is configured to run the computer program to execute the following operations:

Reference samples adjacent to at least one side of a decoding block are acquired to obtain a first set of neighbouring reference samples.

A reference point is determined from the at least one side, and reference sample positions to be selected corresponding to the at least one side are determined according to a preset number of samples.

Reference samples corresponding to the reference sample positions to be selected are selected from the first set of the neighbouring reference samples based on the reference sample positions to be selected, and the selected reference sample forms a subset of the neighbouring reference samples.

Prediction decoding is performed on the decoding block based on the subset of the neighbouring reference samples.

It can be understood that the memory 1602 in the embodiment of the disclosure may be a volatile memory or a nonvolatile memory, or may include both the volatile and nonvolatile memories. The nonvolatile memory may be a ROM, a Programmable ROM (PROM), an Erasable PROM (EPROM), an Electrically EPROM (EEPROM) or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DRRAM). It is to be noted that the memory 1602 of a system and method described in the disclosure is intended to include, but not limited to, memories of these and any other proper types.

The processor 1603 may be an integrated circuit chip with a signal processing capability. In an implementation process, each operation of the method may be completed by an integrated logic circuit of hardware in the processor 1603 or an instruction in a software form. The processor 1603 may be a universal processor, a Digital Signal Processor (DSP), an Application Specific Integrated Circuit (ASIC), a Field Programmable Gate Array (FPGA) or another Programmable Logic Device (PLD), discrete gate or transistor logical device and discrete hardware component. Each method, step and logical block diagram disclosed in the embodiments of the disclosure may be implemented or executed. The universal processor may be a microprocessor or the processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a RAM, a flash memory, a ROM, a PROM or EEPROM and a register. The storage medium is located in the memory 1602. The processor 1603 reads information in the memory 1602 and completes the operations of the method in combination with hardware.

It can be understood that these embodiments described in the disclosure may be implemented by hardware, software, firmware, middleware, a microcode or a combination thereof. In case of implementation with the hardware, the processing unit may be implemented in one or more ASICs, DSPs, DSP Devices (DSPDs), PLDs, FPGAs, universal processors, controllers, microcontrollers, microprocessors, other electronic units configured to execute the functions in the disclosure or combinations thereof.

In case of implementation with the software, the technology of the disclosure may be implemented through the modules (for example, processes and functions) executing the functions in the disclosure. A software code may be stored in the memory and executed by the processor. The memory may be implemented inside the processor or outside the processor.

In at least one embodiment, as another embodiment, the processor 1603 is further configured to run the computer program to execute the operations of the method in the technical solution illustrated in FIG. 8.

It is to be noted that the technical solutions in the embodiments of the disclosure may be freely combined without conflicts.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

INDUSTRIAL APPLICABILITY

In the embodiments of the disclosure, reference samples adjacent to at least one side of a decoding block are acquired at first to obtain a first set of neighbouring reference samples. Then, a reference point is determined from the at least one side, and reference sample positions to be selected corresponding to the at least one side are determined according to a preset number of samples. The reference samples corresponding to the reference sample positions to be selected are selected from the first set of the neighbouring reference samples based on the reference sample positions to be selected, and the selected reference samples form a subset of the neighbouring reference samples. Finally, prediction decoding is performed on the decoding block based on the subset of the neighbouring reference samples. Both importance and dispersion are considered for selection of neighbouring reference samples in the subset of the neighbouring reference samples, so that model parameters constructed based on the subset of the neighbouring reference samples is relatively accurate, and the video picture decoding prediction performance may be improved. Moreover, the subset of the neighbouring reference samples includes few samples, so that the search complexity is also reduced, the video picture decoding prediction performance is improved, and the bit rate is further reduced.

The invention claimed is:

1. A prediction method for decoding, comprising:
   acquiring reference samples adjacent to at least one side of a coding block;
   determining a reference point from the at least one side and determining reference sample positions corresponding to the at least one side according to a preset number of samples;
   deriving reference samples corresponding to the reference sample positions from the reference samples; and
   performing prediction on the coding block based on the derived reference samples, wherein the performing prediction comprises:
      determining model parameters of a prediction model based on the derived reference samples, wherein the prediction model is configured to represent a prediction relationship between a first colour component and a second colour component corresponding to a sample in the coding block, comprising: determining, from the derived reference samples, a maximum $L_{max}$ and minimum $L_{min}$ of first colour component neighbouring reference values and second colour component neighbouring reference values $C_{max}$ and $C_{min}$ corresponding to reference samples at positions corresponding to $L_{max}$ and $L_{min}$; and calculating model parameters according to $L_{max}$, $L_{min}$, $C_{max}$ and $C_{min}$ by using the formula (3):

$$\begin{cases} \alpha = \frac{L_{max} - L_{min}}{C_{max} - C_{min}} \\ \beta = L_{min} - \alpha \cdot C_{min} \end{cases} \quad (3)$$

where $\alpha$ and $\beta$ represent model parameters; and
   performing prediction on the coding block based on the prediction model.

2. The method of claim 1, wherein the at least one side comprises at least one of a left side or an upper side of the coding block.

3. The method of claim 1, wherein determining the reference point from the at least one side comprises:
   based on a length of the at least one side, responsive to that the midpoint of the at least one side is at a middle position between two reference samples, determining a first reference sample position on the right of the middle position as the reference point of the at least one side, or determining a first reference sample position on the left of the middle position as the reference point of the at least one side.

4. The method of claim 1, wherein determining the reference point from the at least one side comprises:
   based on the length of the at least one side, responsive to that the midpoint of the at least one side is at a middle position between two reference samples, determining a first reference sample position lower than the middle position as the reference point of the at least one side, or determining a first reference sample position upper than the middle position as the reference point of the at least one side.

5. The method of claim 1, wherein determining the reference point from the at least one side and determining the reference sample positions corresponding to the at least one side according to the preset number of samples comprises:
   calculating a first sampling interval based on the preset number of samples and the length of the at least one side; and
   determining the reference point from the at least one side, and determining the reference sample positions corresponding to the at least one side according to the first sampling interval.

6. The method of claim 5, wherein determining the reference point from the at least one side and determining the reference sample positions corresponding to the at least one side according to the first sampling interval comprises:
   calculating a midpoint value of the at least one side based on the length of the at least one side;
   calculating reference sample positions according to the midpoint value and the first sampling interval; and
   when the midpoint value is non-integral, rounding down a reference sample position on a left side of the midpoint value and determining the rounded reference sample position as a reference sample position, rounding up a reference sample position on a right side of the midpoint value and determining the rounded reference sample position as the reference sample position.

7. The method of claim 5, wherein determining the reference point from the at least one side and determining the reference sample positions corresponding to the at least one side according to the first sampling interval comprises:
   calculating a midpoint value of the at least one side based on the length of the at least one side;
   calculating reference sample positions according to the midpoint value and the first sampling interval; and
   when the midpoint value is non-integral, rounding up a reference sample position on the left side of the midpoint value and determining the rounded reference sample position as a reference sample position, rounding down a reference sample position on the right side of the midpoint value and determining the rounded reference sample position as the reference sample position.

8. The method of claim 5, further comprising:
   regulating the first sampling interval to obtain a second sampling interval; and
   determining the reference point from the at least one side, and determining the reference sample positions corresponding to the at least one side according to the second sampling interval.

9. The method of claim 8, further comprising:
   determining the reference point from the at least one side, determining a reference sample position corresponding to a left side of the reference point according to the first sampling interval, and determining a reference sample position corresponding to a right side of the reference point according to the second sampling interval.

10. The method of claim 5, wherein calculating the first sampling interval based on the preset number of samples and the length of the at least one side comprises:
   calculating the first sampling interval based on the preset number of samples and the length of the at least one side by using the formula (1):

$$\Delta = \text{length}/(N_2/2) \quad (1)$$

where Δ represents the first sampling interval, length represents the length of the at least one side, and $N_2$ represents the preset number of samples;

determining the reference point from the at least one side and determining the reference sample positions corresponding to the at least one side according to the first sampling interval comprises:

calculating a starting position of reference samples according to the first sampling interval by using the formula (2); and determining the reference sample positions corresponding to the at least one side according to the starting position of reference samples and the first sampling interval;

$$\text{shift} = \Delta/2 \qquad (2)$$

where shift represents a starting position of the reference samples.

11. The method of claim 10, wherein determining the reference sample positions corresponding to the at least one side according to the starting position of the reference samples and the first sampling interval comprises:

determining the reference sample positions corresponding to the at least one side to be 2, 6, 10 and 14 when the starting position of the reference samples is 2 and the sampling interval is 4.

12. The method of claim 1, wherein determining the reference point from the at least one side and determining the reference sample positions corresponding to the at least one side according to the preset number of samples comprises:

determining, when the length of the at least one side is 8 and the preset number of samples is 2, the reference sample positions corresponding to the at least one side to be 2 and 6, or 1 and 5, or 1 and 6, or 2 and 5.

13. The method of claim 1, wherein determining the reference point from the at least one side and determining the reference sample positions corresponding to the at least one side according to the preset number of samples comprises:

determining the reference point from the at least one side, and determining continuous reference sample positions near the reference point as the reference sample positions according to the preset number of samples, the reference point being at a middle position of the reference sample positions.

14. The method of claim 13, further comprising:

determining, when the length of the at least one side is 8 and the preset number of samples is 3, the reference sample positions corresponding to the at least one side to be 2, 3 and 4, or 3, 4 and 5.

15. The method of claim 1, wherein the coding block comprises a square coding block or a non-square coding block.

16. The method of claim 1, wherein determining the reference point from the at least one side and determining the reference sample positions corresponding to the at least one side according to the preset number of samples comprises:

acquiring, from the reference samples, remaining reference samples except reference samples corresponding to a starting position and ending position of the at least one side; and determining the reference point from the at least one side, and determining the reference sample positions based on the remaining reference samples and the preset number of samples.

17. A prediction device for decoding, comprising a memory and a processor, wherein the memory is configured to store a computer program capable of running in the processor; and the processor is configured to run the computer program to execute a prediction method for decoding, comprising:

acquiring reference samples adjacent to at least one side of a coding block;

determining a reference point from the at least one side and determining reference sample positions corresponding to the at least one side according to a preset number of samples;

deriving reference samples corresponding to the reference sample positions from the reference samples; and performing prediction on the coding block based on the derived reference samples, wherein the performing prediction comprises:

determining model parameters of a prediction model based on the derived reference samples, wherein the prediction model is configured to represent a prediction relationship between a first colour component and a second colour component corresponding to a sample in the coding block, comprising: determining, from the derived reference samples, a maximum $L_{max}$ and minimum $L_{min}$ of first colour component neighbouring reference values and second colour component neighbouring reference values $C_{max}$ and $C_{min}$ corresponding to reference samples at positions corresponding to $L_{max}$ and $L_{min}$; and calculating model parameters according to $L_{max}$, $L_{min}$, $C_{max}$ and $C_{min}$ by using the formula (3):

$$\begin{cases} \alpha = \dfrac{L_{max} - L_{min}}{C_{max} - C_{min}} \\ \beta = L_{min} - \alpha \cdot C_{min} \end{cases} \qquad (3)$$

where α and β represent model parameters; and performing prediction on the coding block based on the prediction model.

18. A non-transitory computer storage medium, storing a prediction program for decoding, wherein the prediction program for decoding is executed by at least one processor to implement a prediction method for decoding, comprising:

acquiring reference samples adjacent to at least one side of a coding block;

determining a reference point from the at least one side and determining reference sample positions corresponding to the at least one side according to a preset number of samples;

deriving reference samples corresponding to the reference sample positions from the reference samples; and performing prediction on the coding block based on the derived reference samples, wherein the performing prediction comprises:

determining model parameters of a prediction model based on the derived reference samples, wherein the prediction model is configured to represent a prediction relationship between a first colour component and a second colour component corresponding to a sample in the coding block, comprising: determining, from the derived reference samples, a maximum $L_{max}$ and minimum $L_{min}$ of first colour component neighbouring reference values and second colour component neighbouring reference values $C_{max}$ and $C_{min}$ corresponding to reference samples at positions corresponding to $L_{max}$ and $L_{min}$; and calculating model parameters according to $L_{max}$, $L_{min}$, $C_{max}$ and $C_{min}$ by using the formula (3):

$$\begin{cases} \alpha = \dfrac{L_{max} - L_{min}}{C_{max} - C_{min}} \\ \beta = L_{min} - \alpha \cdot C_{min} \end{cases} \quad (3)$$

where $\alpha$ and $\beta$ represent model parameters; and
performing prediction on the coding block based on the prediction model.

\* \* \* \* \*